United States Patent [19]

Kriegesmann et al.

[11] Patent Number: 4,564,601
[45] Date of Patent: Jan. 14, 1986

[54] SHAPED POLYCRYSTALLINE SILICON CARBIDE ARTICLES AND ISOSTATIC HOT-PRESSING PROCESS

[75] Inventors: Jochen Kriegesmann, Durach-Bechen; Klaus Hunold, Kempten; Alfred Lipp, Bad Worishofen; Klaus Reinmuth, Durach; Karl A. Schwetz, Sulzberg, all of Fed. Rep. of Germany

[73] Assignee: Elektroschmelzwerk Kempten GmbH, Munich, Fed. Rep. of Germany

[21] Appl. No.: 646,022

[22] Filed: Aug. 29, 1984

Related U.S. Application Data

[63] Continuation of Ser. No. 396,437, Jul. 8, 1982, abandoned.

[30] Foreign Application Priority Data

Jul. 28, 1981 [DE] Fed. Rep. of Germany ....... 3129633

[51] Int. Cl.$^4$ ............................................. C04B 35/56
[52] U.S. Cl. ....................................... 501/88; 501/90; 264/65
[58] Field of Search ...................... 501/88, 90; 264/65

[56] References Cited

U.S. PATENT DOCUMENTS

| | | | |
|---|---|---|---|
| 4,105,455 | 8/1978 | Koga et al. | 501/88 |
| 4,230,497 | 10/1980 | Schwetz et al. | 501/89 |
| 4,310,481 | 1/1982 | Baney | 501/88 |
| 4,310,482 | 1/1982 | Baney | 501/88 |
| 4,326,039 | 4/1982 | Kriegesman et al. | 501/88 |
| 4,381,931 | 3/1983 | Hunold et al. | 264/65 |

FOREIGN PATENT DOCUMENTS 1522705 8/1978 United Kingdom ................ 501/97

*Primary Examiner*—Mark L. Bell
*Attorney, Agent, or Firm*—Burgess, Ryan & Wayne

[57] ABSTRACT

The invention is substantially pore-free shaped articles which consist essentially of polycrystalline $\alpha$- or $\beta$-silicon carbide in the form of a single-phase homogeneous microstructure having grain sizes not exceeding 8 $\mu$m, and which are manufactured from SiC powder, without the concomitant use of sintering aides, by isostatic hot-pressing in a vacuum-tight casing at temperatures of from about 1900° C. to 2300° C. and at pressures of from about 100 to 400 MPa. The SiC starting materials have $\alpha$- and/or $\beta$-SiC powders having a total content of metallic impurities not exceeding 0.1% by weight and a particle size of 4 $\mu$m and finer.

5 Claims, No Drawings

SHAPED POLYCRYSTALLINE SILICON CARBIDE ARTICLES AND ISOSTATIC HOT-PRESSING PROCESS

This application is a continuation of application Ser. No. 396,437 filed July 8, 1982 now abandoned.

Shaped articles comprising polycrystalline silicon carbide are known. They are distinguished by a combination of valuable properties such as oxidation stability, good thermal shock resistance, high thermal conductivity, high mechanical strength and a high degree of hardness. In view of their properties, shaped polycrystalline silicon carbide articles are useful in high temperature machines, especially hot gas turbines.

BACKGROUND OF THE INVENTION

The manufacture of shaped polycrystalline silicon carbide articles is, however, not without difficulty. It is known that, without the concomitant use of sintering aids, drastic conditions are required to produce dense shaped articles from pure silicon carbide powder. Manufacture of polycrystalline articles from pure silicon carbide which approach the true density of the material requires a temperature in the range of 3500° C. to 4000° C. and simultaneously, a pressure of 689 MPa (100,000 psi) (see U.S. Pat. No. 3,158,442) or the conditions for diamond synthesis (see U.S. Pat. No. 3,667,911).

Because of the poor sinterability of silicon carbide powder, various additives have been used as sintering aids to provide moderately dense to dense, shaped articles. The density of the shaped articles is dependent on the process used in each case. High density alone, however, is not the sole criterion for predicting excellent properties in the shaped articles. Density is not a good predictor for high temperature flexural strength which should remain satisfactory at high temperatures that is, up to at least 1500° C.

One of the early processes for the manufacture of dense shaped silicon carbide articles is based on reaction sintering, in which silicon carbide powder is processed with carbon and/or an organic resin binder to form preshaped articles which are subsequently heated in the presence of an atmosphere containing silicon. In the process, the carbon reacts with the silicon to form additional SiC thus bonding the SiC grains already present. Pores are simultaneously filled by infiltration with excess silicon. Although the sintered articles obtained in that manner are substantially pore free and have a very high density, they contain free silicon. Narrow limits are therefore set on their use in high temperature machines since at temperatures exceeding 1400° C., they tend to exude silicon (m.p. 1440° C.).

Dense shaped silicon carbide articles can also be manufactured by the conventional hot-pressing or pressure-sintering process using graphite molds and additives containing aluminium or boron as sintering aids.

The best results which could hitherto be achieved by means of the hot-pressing or pressure-sintering process were shaped articles consisting of polycrystalline α- or β-silicon carbide having a density of at least 99% of the theoretical density of silicon cabide (abbreviated hereinafter as %TD). The shaped articles were manufactured by hot-pressing, with simultaneous shaping from α- or β-SiC powder together with small amounts of an additive containing aluminium such as aluminium powder, aluminium nitride or aluminium phosphide, at temperatures of up to 2200° or 2300° C. using a die pressure of at least 100 bar (10 MPa).

The shaped articles manufactured in that manner have a substantially single-phase microstructure since the additional components are present substantially in the form of a solid solution in the SiC lattice. They have good high-temperature strength, with flexural strengths of from at least 600N/mm$^2$ at 1450° C. which do not, however, reach values of 700N/mm$^2$ (see EPO No. 021 239 A 1 and EPO No. 022 522 A 1).

Although the shaped articles consisting of polycrystalline silicon carbide obtained in that manner and having low porosity have good high-temperature properties, the formation, during manufacture, of vitreous alumino-silicate phases at the grain boundaries of the powder being densified cannot be completely eliminated due to the essential concomitant use of an aluminium-containing additive as a sintering aid. The vitreous aluminosilicate phases at the grain boundaries can, even in very low concentrations, adversely affect the physical properties of the articles.

The possibilities of forming articles by hot die pressing are limited since only relatively simple shaped articles can be manufactured. A conventional hot press using die pressure can, in each case, densify simultaneously only one or at most, a few shaped articles.

Attempts have been made to replace the expensive hot-pressing process for forming silicon carbide articles by the pressureless-sintering process.

The best results achieved with the pressureless sintering provided only shaped articles consisting of polycrystalline α-SiC having less than 99%TD. The shaped articles were formed by cold pressing α-SiC, in the form of submicron powder, together with an aluminium-containing additive and a carbon-containing additive and then sintering the shaped articles without pressure at a temperature of from 2000° C. to 2300° C.

In the shaped articles manufactured by pressureless sintering, the additional carbon is present at least partially in free elemental form, and appears as a second phase alongside the SiC. The flexural strength of the shaped articles which have a total porosity of, at most 2% by volume, are about 600N/mm2 (see EP O No. 004 031 B1).

The problem therefore is to make available substantially pore-free shaped articles of polycrystalline silicon carbide which have been manufactured, without the concomitant use of sintering aids, from pure SiC powder, without the use of drastic conditions with regard to pressure and temperature, or the conditions for diamond synthesis.

BRIEF DESCRIPTION OF THE INVENTION

The substantially pore-free shaped articles according to the present invention consist essentially of polycrystalline α- and/or β-silicon carbide in the form of a single-phase homogeneous microstructure having grain sizes not exceeding about 8 μm. The articles of the present invention are manufactured from pure SiC powder have a total content of metal impurities not exceeding about 0.1% by weight. The silicon carbide powder is isostatically hot-pressed in a vacuum-tight casing at a temperature of from about 1900° C. to 2300° C. and a pressure of from about 100 to 400 MPa (1 to 4 kbar) using an inert gas as pressure-transfer medium. The process can be carried out in a high pressure autoclave.

DETAILED DESCRIPTION OF THE INVENTION

The shaped articles according to the invention are formed from starting materials, comprising fine powders of α- or β-SiC, or mixtures consisting of α- and β-SiC, having a particle size of about 4 μm and finer and having an Sic content of at about least 97.5% by weight. According to the present invention, the total content of metallic impurities in the fine powders does not exceed about 0.1% by weight. By metallic impurities is meant all metallic elements, except silicon present in bonded form. The difference up to 100% by weight remaining, is divided, for the most part, between oxygen, in the form of adhering silica, and adhering carbon.

Up to, at most, about 0.6% by weight of adhering carbon which is formed during silicon carbide manufacture can be tolerated. The adhering silica, which is formed as a result of the tendency of silicon carbide to oxidize during the milling process can be present in an amount of up to, at most, about 1.8% by weight. The adhering silica can be removed if required by subsequent treatment with hydrofluoric acid. The residual silica and carbon is higher in finer powders.

The specific surface area (measured according to the BET method) is advantageously used as measure of the particle size of the powder of about 4 μm and finer. Silicon carbide powder having a specific surface area of from 4 to 40 m$^2$/g, preferably from 5 to 20 m$^2$/g, has proved especially useful for manufacturing articles by the process of the present invention. The shaped articles according to the invention can be manufactured from silicon carbide powder without pretreatment. Prefabricated casings or capsules of any desired shape are loaded with the silicon carbide powder and the powder densified by vibratory means. Subsequently, the casings together with their contents are evacuated and then sealed gas-tight.

In another method, the silicon carbide powder is preshaped into articles having open pores that is, pores open to the surface, and then the preshaped articles are provided with a gas-tight casing. For shaping, the silicon carbide powder can be mixed with a temporary binder or can be dispersed in a solution of a temporary binder in an organic solvent.

Suitable organic solvents are for example, ketones, such as acetone and lower aliphatic alcohols having from 1 to 6 carbon atoms. Examples of temporary binders are polyvinyl alcohol, stearic acid, polyethylene glycol and camphor, which can be used in quantities of up to about 5% by weight, based on the weight of the SiC.

The concomitant use of a temporary binder is not, however, absolutely necessary. For example, the fine powders may be moistened with an organic solvent, isopropyl alcohol having proved especially useful. Shaping can be carried out by conventional procedures such as, for example, die pressing, isostatic pressing, injection molding, extrusion molding or slip casting, at room temperature or at an elevated temperature.

After shaping, the green bodies preferably have a theoretical density of at least about 50%TD and preferably about 60% TD. Subsequently, the green bodies are preferably subjected to a thermal treatment by heating to from about 300° C. to 1200° C., before they are provided with the gas-tight casing. The preheating is generally preferred to insure that, during the hot isostatic densification, no gaseous decomposition products from the binders interfere with the densification process or damage the casing.

The material for the casings must be plastically deformable at the densification temperature of from about 1900° C. to 2300° C. required for SiC. The casings can be made from high-melting metals such as tungsten, molybdenum or tantalum, metal alloys, intermetallic compounds, such as molybdenum silicide or tungsten silicide, high-melting glasses such as silica glass or high-melting types of ceramics. When using SiC powder without a binder, prefabricated casings or capsules are generally required. Prefabricated casings can also be used in the case of preshaped articles.

In the case of preshaped articles, however, the gas-tight casing can also be produced by direct coating, for example by electroless wet deposition of a metal layer or by applying a vitreous or ceramic-type paste which is subsequently fused or sintered to form the gas-tight casing.

The encased samples are advantageously introduced in graphite containers into a high-pressure autoclave and heated to a densification temperature of at least about 1900° C. It is advantageous to control the pressure and temperature separately so that the gas pressure is increased only when the casing material begins to deform plastically under the pressure. Preferably argon or nitrogen are used as inert gases for the transfer of pressure. The pressure is preferably within the range of about 150 to 250 MPa (1.5 to 2.5 kbar) and is reached by slow increase at the final temperature used in each case, which is preferably in the range of from about 1950° C. to 2100° C. The optimum temperature in each case is dependent on the fineness and purity of the SiC powder and should not be exceeded. If the temperature is too high, there is a danger that the substantially pore-free shaped articles will have a "secondary recrystallized structure" which is not homogeneous because some grains have grown substantially more than the others.

After the temperature and pressure have been reduced, the cooled articles are removed from the high-pressure autoclave and freed from the casings as, for example by twisting off the metal casings, by sand blasting the glass or ceramic casings, or by chemical removal.

The shaped articles manufactured in the above manner are substantially pore-free, and have a density of at least 99% TD. Owing to the multidirectional application of pressure, the articles are also substantially free of texture so that their properties are no longer direction dependent, but are uniform in all directions. Values of flexural strength greater than about 700N/mm$^2$ which remain unchanged up to about 1400° C., are achieved by the present process. The high-temperature flexural strength is not affected by secondary phases at the grain boundaries from sintering aid additives. At the same time, owing to the uniformity of the physical properties in comparison with hot-pressed and pressureless sintered SiC, a lower standard deviation in the values of the properties is achieved. The lower standard deviations can be seen in the case of the flexural strength by a relatively high Weibull module.

The shaped articles consist essentially of α- or β-SiC, depending on the modification of the starting SiC powder used. Accordingly, the shaped polycrystalline articles manufactured according to the process of the invention not only have better physical properties than articles manufactured with concomitant use of sintering aids but they can also be manufactured in a relatively simple manner since both the expensive mixing process, which is absolutely necessary for the homogeneous distribution of the sintering aids, and the limited shaping possibilities in the case of conventional hot pressing are dispensed with.

High-pressure autoclaves may have a large oven space in which numerous encased articles of any desired form can be simultaneously hot-isostatically densified.

Although it is known that, with the aid of the isostatic hot-pressing process, articles consisting essentially of pulverulent materials can be highly densified, it must be considered unexpected that, in the case of silicon carbide, they can be produced without the concomitant use of sintering aids under substantially the same temperature conditions as have been used hitherto to produce articles by hot-pressing of SiC with the use of sintering aids.

Although the pressure used in the process of the present invention is higher than that used in the prior art hot pressing processes, the increased pressure alone cannot be responsible for the results achieved. The investigations of J. S. Nadeau reported in *Ceramic Bulletin*, Vol. 52, page 170–174 (1973) have shown that pure SiC powder, without sintering aids, could be densified up to 99.5% TD by hot pressing with the use of die pressure only at temperatures above 2500° C. under a pressure of from 3000 to 5000 MPa (30 to 50 kbar). The same density can be achieved by cold pressing at a pressure of 5000 MPa (50 Kbar) and subsequent hot pressing at only 1500° C. at a pressure of 1000 MPa (10 kbar), but the bonding of the grains was so weak that they can be separated from one another by light scratching with the point of a needle.

The invention is explained in detail with reference to the following examples:

EXAMPLE 1

50 g of β-SiC powder having the following analysis

|  | % by weight |
| --- | --- |
| SiC | 98.50 |
| $SiO_2$ | 0.83 |
| adherent C | 0.35 |
| F | <0.01 |
| N | 0.05 |
| Al | 0.03 |
| Fe | 0.03 |
| B | <0.01 |
| Mg | <0.01 |
| Ti | <0.01 |
| Ni | <0.01 |
| Ca | <0.005 | and having a specific surface area of 12.7 m$^2$/g was poured into a silica-glass casing having a diameter of 20 mm and a height of 120 mm and densified by vibration. The casing was then heated under high vacuum to 1000° C. and hermetically sealed by an oxyhydrogen torch. The encased sample was densified at 2050° C. under 200 MPa (2 Kbar) maximum pressure with a dwell time of 30 minutes under argon. After cooling and removal of the residual glass, three bending samples measuring 2×4×34 mm were cut from the shaped article. The average 4-point flexural strength (lower support distance 30 mm, upper support distance 15 mm) was 722N/mm$^2$. The samples broke in a trans-granular manner. The average density was 3.18 g/cm$^2$, which corresponds to 99% of the theoretical density.

EXAMPLE 2

600 g of α-silicon carbide powder having the following analysis

|  | % by weight |
| --- | --- |
| SiC | 97.80 |
| $SiO_2$ | 1.44 |
| adherent C | 0.58 |
| F | 0.01 |
| N | <0.01 |
| Al | 0.02 |
| Fe | <0.01 |
| B | <0.01 |
| Mg | <0.01 |
| Ti | <0.01 |
| Ni | <0.01 |
| Ca | <0.005 | and having a specific surface area of 14.6 m$^2$/g was mixed with 3% by weight of camphor in acetone in a kneading device for 3 hours. The powder, dried in a drying cabinet at 60° C. for 4 hours, was preshaped by isostatic cold-pressing in rubber casings at 500 MPa (5 kbar) to form green bodies having an approximate diameter of 20 mm and an approximate height of 100 mm. The green bodies were fitted into welded molybdenum casing tubes having a wall thickness of 1 mm and an internal diameter of 20 mm and were de-gassed in a high vacuum for 1 hour at 1000° C. Subsequently, molybdenum lids were welded onto the casing tubes in an electron-beam welding installation. The encased samples were densified by isostatic hot-pressing for 1 hour at 2000° C. under an argon pressure of 200 MPa (2 kbar). In each case, 5 bending samples having the dimensions of Example 1 were cut from the shaped articles. The shaped articles had an average density of 3.19 g/cm$^3$ (99.4%TD), and flexural strength was determined using the bending apparatus described in Example 1 at room temperature and at 1370° C. It was, on average, 776 N/mm$^2$ at room temperature and 793N/mm$^2$ at 1370° C. The microstructure had a grain size not larger than 4 μm.

EXAMPLE 3

3% by weight of camphor was added to 100 g of α-SiC powder having the following analysis

|  | % by weight |
| --- | --- |
| SiC | 98.90 |
| $SiO_2$ | 0.60 |
| adherent C | 0.18 |
| F | <0.01 |
| N | 0.06 |
| Al | 0.03 |
| Fe | 0.03 |
| B | <0.01 |
| Mg | <0.01 |
| Ti | <0.01 |
| Ni | <0.01 |
| Ca | <0.005 | and having a specific surface area of 7.0 m$^2$/g. The mixture was agitated with steel balls for 30 minutes in a plastic container. The mixture was dried at 60° C. in a vacuum drying cabinet and preshaped by isostatic cold-pressing in a rubber container at 500 MPa (5 kbar) to form a green body. The green body was heated in vacuo at 1000° C. and placed in a silica-glass casing which was evacuated and then hermetically sealed using an oxyhydrogen torch. Subsequently, the encased sample was densified by isostatic hot-pressing in an argon atmosphere at 2000° C. under a pressure of 200 MPa (2 kbar) for 2 hours. The shaped article had a density of 3.20 g/cm$^3$ that is, 99.7% of the theoretical density. The microstructure of the sample had grain sizes not larger than 5 μm.

It should be noted that this powder, together with 1% by weight of boron and 1% by weight of carbon, added as novolak, was sintered without pressure and formed a shaped article having a density of 2.80 g/cm$^3$ that is, about 87% of the theoretical density.

We claim:

1. A substantially pore-free shaped article consisting essentially of pure polycrystalline α- and/or β-silicon carbide, said article having a total content of metal impurities less than about 0.1% by weight, and having a single-phase homogeneous microstructure with a grain size not exceeding about 8 μm, obtained from pure SiC powder having a total content of metal impurities less than about 0.1% by weight, by isostatic hot-pressing in a vacuum-tight casing at a temperature of from about 1900° C. to 2300° C. and a pressure of from about 100 to 400 MPa (1 to 4 kbar) using an inert gas as a pressure-transfer medium.

2. Shaped articles according to claim 1, wherein the silicon carbide powder consists essentially of

| | |
|---|---|
| at least | 97.5% by weight of α- and/or β-SiC; |
| up to | 1.8% by weight of SiO$_2$; |
| up to | 0.6% by weight of C; and |
| up to | 0.1% by weight of metallic impurities, | and having a particle size not exceeding about 4 μm.

3. A process for manufacturing the pore-free articles of claim 1 or 2 by isostatic hot pressing using an inert gas as a pressure transfer medium which comprises:
   (a) loading a preformed casing with silicon carbide;
   (b) packing the silicon carbide into the casing by vibratory means;
   (c) subjecting to vacuum, at least the interior of the packed casing;
   (d) sealing the evacuated packed casings vacuum-tight and
   (e) heating the vacuum-tight sealed casing to a temperature of from about 1900° C. to 2300° C. while slowly increasing the gas pressure on the exterior of the vacuum-tight sealed casing to about 100 to 400 MPa (1 to 4 kbar) for a sufficient length of time to form a substantially pore-free shaped article.

4. A process for manufacturing shaped articles of claim 1 or 2 by isostatic hot pressing using an inert gas as pressure transfer medium which comprises:
   (a) forming a preshaped article having pores open at the surface from a mixture of silicon carbide and a temporary binder, said preshaped article having a density of at least 50% of the theoretical density of silicon carbide;
   (b) thermally treating said preshaped article at a temperature of from about 300° C. to 1200° C. to substantially remove the temporary binder from the preshaped article and to insure that gaseous decomposition products from the binder have been substantially removed from the preshaped article;
   (c) encasing said preshaped article under vacuum in a vacuum-tight casing said casing being plastically deformable at a temperature of about 1900° C. to 2300° C.; and
   (d) heating said encased preshaped article to a temperature of from about 1900° C. to 2300° C. while slowly increasing the pressure on the exterior of the encased preshaped article to about 100 to 400 MPa (1 to 4 kbar) for a sufficient length of time to form the substantially pore-free shaped article.

5. The process of claim 4 wherever the gas tight casing is produced by coating said preshaped article with a material which is fused or sintered at an elevated temperature under a vacuum to form a vacuum sealed casing about said preshaped article.

* * * * *